(12) United States Patent
Isogai

(10) Patent No.: US 8,176,898 B2
(45) Date of Patent: May 15, 2012

(54) FUEL DELIVERY PIPE AND METHOD OF MANUFACTURING THE SAME

(75) Inventor: Eiji Isogai, Hekinan (JP)

(73) Assignee: Otics Corporation, Aichi (JP)

( * ) Notice: Subject to any disclaimer, the term of this patent is extended or adjusted under 35 U.S.C. 154(b) by 44 days.

(21) Appl. No.: 12/872,060

(22) Filed: Aug. 31, 2010

(65) Prior Publication Data

US 2011/0048380 A1    Mar. 3, 2011

(30) Foreign Application Priority Data

Sep. 2, 2009  (JP) .................. 2009-202683

(51) Int. Cl.
*F02M 55/02*      (2006.01)
*F02M 55/00*      (2006.01)

(52) U.S. Cl. ........................ 123/468; 123/456

(58) Field of Classification Search ............ 123/468, 123/469, 456, 447; 29/234
See application file for complete search history.

(56) References Cited

U.S. PATENT DOCUMENTS

| | | | |
|---|---|---|---|
| 6,789,528 B2 * | 9/2004 | Endo | 123/468 |
| 2005/0284447 A1 * | 12/2005 | Usui et al. | 123/468 |

FOREIGN PATENT DOCUMENTS

JP       09-112375       4/1997

* cited by examiner

*Primary Examiner* — Mahmoud Gimie
(74) *Attorney, Agent, or Firm* — Wenderoth, Lind & Ponack, L.L.P.

(57) ABSTRACT

A fuel delivery pipe delivers fuel to a plurality of fuel injection valves corresponding to cylinders of an internal-combustion engine. The fuel delivery pipe includes a pipe body made of carbon steel for machine structural use and a plating film disposed on an inner surface of the pipe body. Preferably, the fuel delivery pipe includes a plating film disposed on an outer surface of the pipe body.

4 Claims, 3 Drawing Sheets

FUEL DELIVERY PIPE AND METHOD OF MANUFACTURING THE SAME

CROSS REFERENCE TO RELATED APPLICATION

This application claims priority from Japanese Patent Application No. 2009-202683 filed on Sep. 2, 2009. The entire content of this priority application is incorporated herein by reference.

TECHNICAL FIELD

The present invention relates to a fuel delivery pipe and a method of manufacturing the same.

BACKGROUND OF THE INVENTION

A vehicle internal-combustion engine has fuel injection valves and a delivery pipe. The fuel injection valves are provided for respective cylinders. The fuel delivery pipe delivers fuel to each of the fuel injection valves. The fuel delivery pipe is made by aluminium die-casting.

However, because the fuel delivery pipe has a lower mechanical strength, a fuel delivery pipe having a higher mechanical strength has been required. Besides, it has been reported that high level of alcohol containing fuel reacts directly with (or causes dry corrosion on) aluminium. Furthermore, it has been shown that gasohol also can cause dry corrosion. Because of this, the inner surface of the fuel delivery pipe needs to be plated with alcohol-corrosion resistant material. However, plating aluminium needs zinc immersion as the pretreatment.

Thus, there is a need for a fuel delivery pipe that has a higher mechanical strength and needs no pretreatment for plating.

SUMMARY OF THE INVENTION

An aspect of the present invention is a fuel delivery pipe for delivering fuel to a plurality of fuel injection valves corresponding to cylinders of an internal-combustion engine. The fuel delivery pipe includes: a pipe body made of carbon steel for machine structural use; and a plating film disposed on an inner surface of the pipe body.

Another aspect of the present invention is a method of manufacturing a fuel delivery pipe for delivering fuel to a plurality of fuel injection valves corresponding to cylinders of an internal-combustion engine. The method includes the successive steps of: a) manufacturing a pipe body, the manufacturing step including forging carbon steel for machine structural use and successively quenching and tempering the carbon steel; and b) plating the inner and outer surfaces of the pipe body.

DETAILED DESCRIPTION OF THE INVENTION

<Embodiment>
(Configuration of Vehicle Fuel Delivery System)

Figure 1:
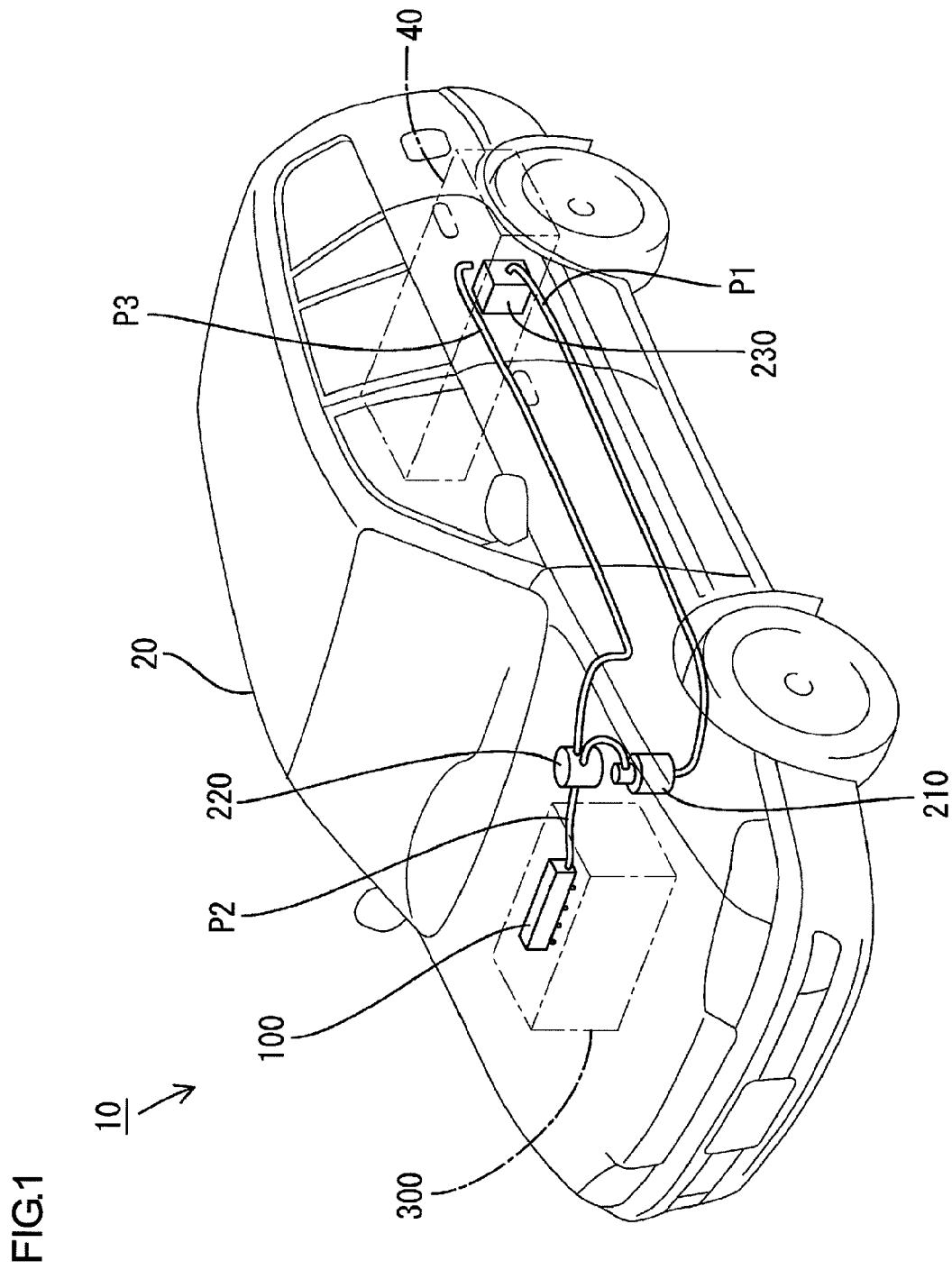
FIG. 1 is a perspective view illustrating a fuel delivery system of an embodiment.

An embodiment in accordance with the present invention will be described. As illustrated in FIG. 1, a vehicle fuel delivery system of this embodiment is installed in a vehicle body 20 of a vehicle 10 to deliver fuel from a tank 40 to an engine 300. The system includes a pump 230, a filter 210, a pressure regulator 220, a transfer pipe P1, an inlet pipe P2, a return pipe P3, and a fuel delivery pipe 100.

The pump 230 pumps up fuel from the tank 40 and transfers the fuel through the transfer pipe P1 toward the engine 300. The filter 210 filters the fuel. The fuel is then supplied through the inlet pipe P2 and through the pressure regulator 220 to the fuel delivery pipe 100. Specifically, the pressure regulator 220 supplies the fuel to the fuel delivery pipe 100 while regulating the pressure of the fuel at a constant pressure. The fuel which is supplied to the fuel delivery pipe 100 is then delivered to the engine 300. The fuel which is not supplied to the fuel delivery pipe 100 returns through the return pipe P3 to the tank 40.

The fuel is high alcohol fuel or gasohol. The alcohol may be, for example, methanol, ethanol, butanol, or propanol.
(Configuration of Fuel Delivery Pipe)

Figure 2:
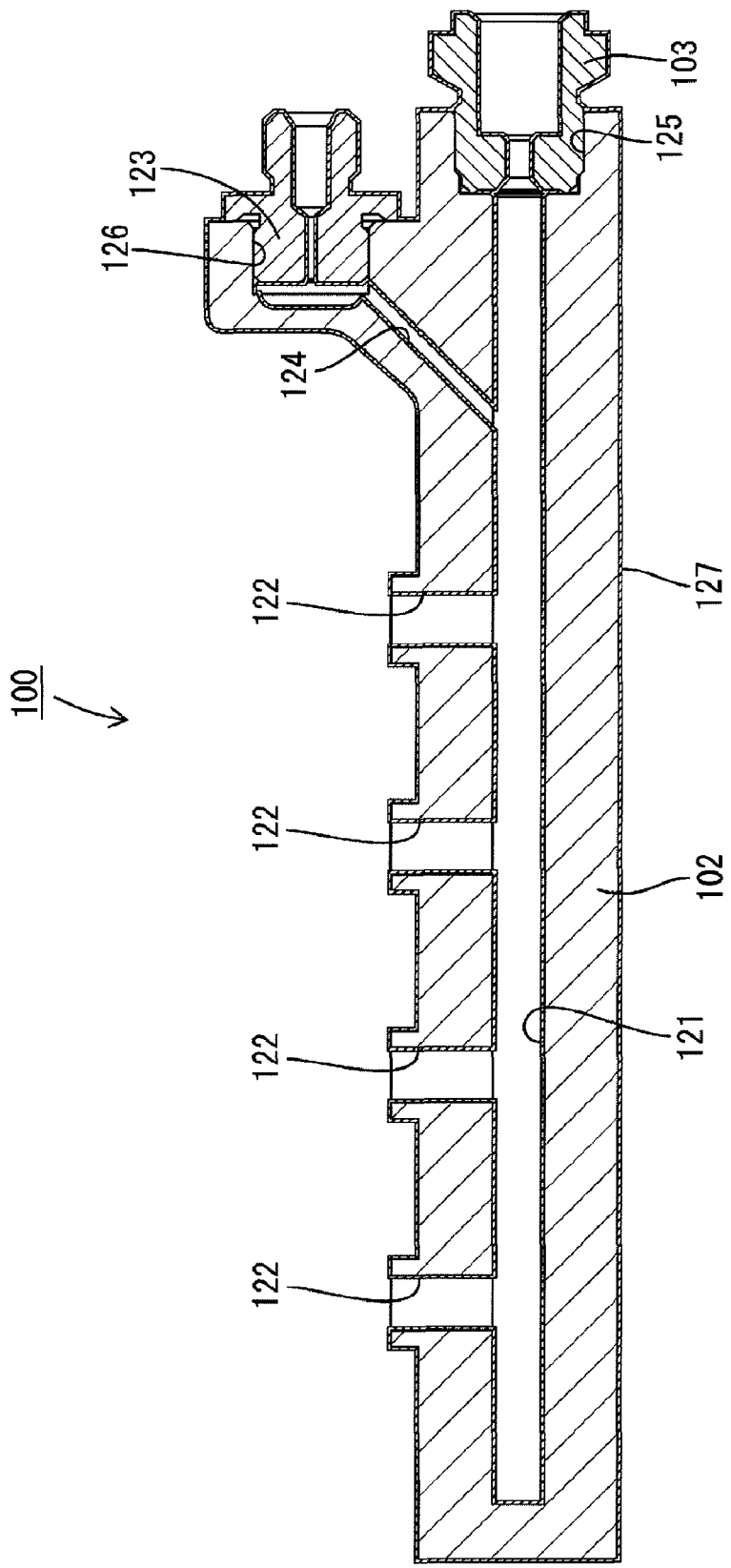
FIG. 2 is a sectional view illustrating a configuration of a fuel delivery pipe.

As illustrated in FIG. 2, the fuel delivery pipe 100 includes a housing 102 (a pipe body) and first and second connecting parts 103, 123 to be connected with the housing 102.

The housing 102 has an elongated shape as a whole. A cylindrical fuel delivery path 121 runs in the housing 102. An end (a left end in FIG. 2) of the fuel delivery path 121 is blind, while the other end (a right end in FIG. 2) is open. A first fitting portion 125 (a connecting portion) is formed at the right end of the fuel delivery path 121. The first fitting portion 125 allows the first connecting part 103 to be fitted therein.

An inlet path 124 runs in an end side (a right side in FIG. 2) of the fuel delivery pipe 100, obliquely from the fuel delivery path 121 to the right end of the fuel delivery pipe 100. One end of the inlet path 124 is in communication with the fuel delivery path 121. A second fitting portion 126 (the connecting portion) is formed at the other end of the inlet path 124. The second fitting portion 126 allows the second connecting part 123 to be fitted therein.

A plurality of (four in this embodiment) fuel injection valve mounting holes 122 run through a thickness of an outer peripheral surface of the housing 102. Each fuel injection valve mounting hole 122 allows a fuel injection valve (not illustrated in the drawings) of the engine 300 to be mounted thereto.

The first connecting part 103 includes a pressure sensor (not illustrated in the drawings). The first connecting part 103 is disposed in the first fitting portion 125 in a manner closing the right end of the fuel delivery path 121. The second connecting part 123 connects the housing 102 with the inlet pipe P2 (see FIG. 1). The second connecting part 123 is disposed in the second fitting portion 126. Thus, the fuel introduced from the inlet path 124 flows into the fuel delivery path 121 and then is injected from the fuel injection valves.

Each of the housing 102 and the first and second connecting parts 103, 123 is a forging of carbon steel for machine structural use (e. g. JIS S45C). The carbon steel for machine structural use will hereinafter be referred to simply as "the carbon steel".

A nickel-phosphorus alloy plating film 127 is formed on inner and outer surfaces of the housing 102 and on exposed portions of the first and second connecting parts 103, 123.

Figure 3:
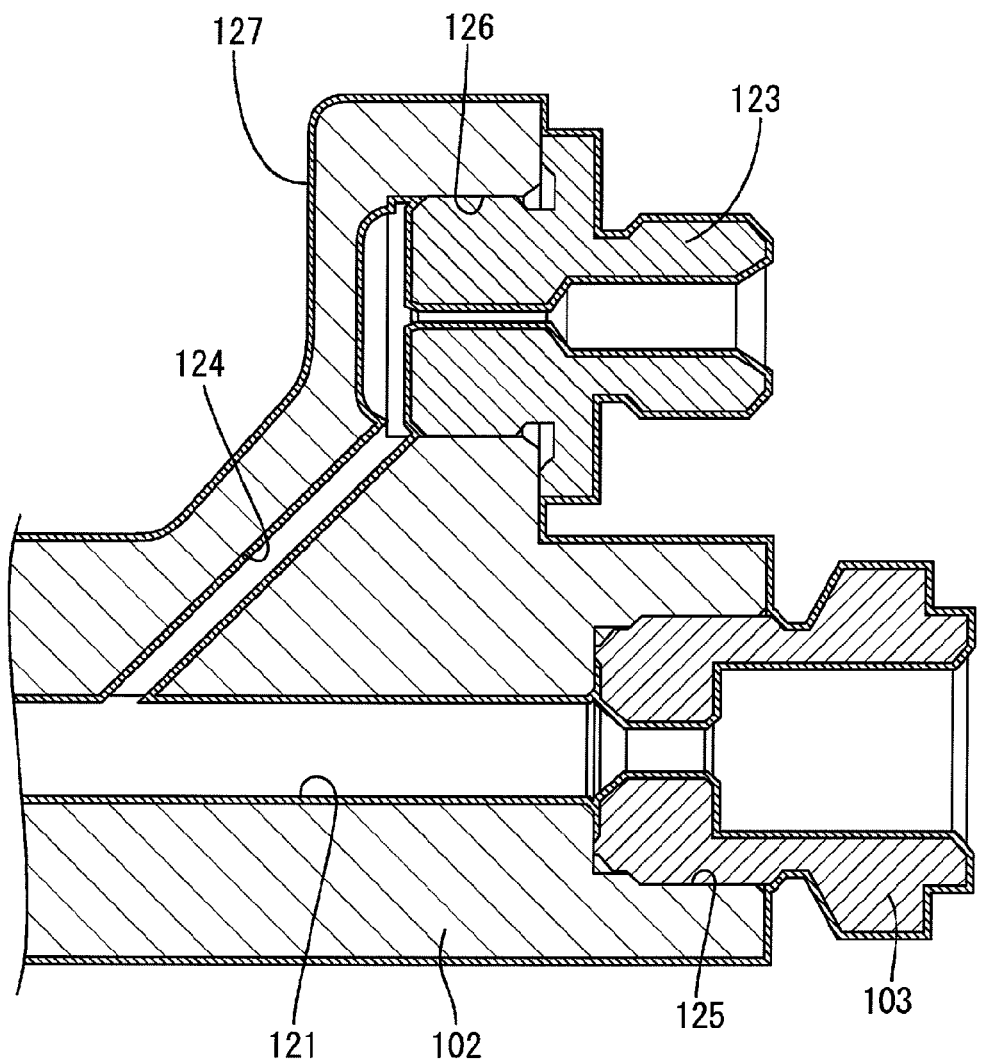
FIG. 3 is a sectional view of a pipe body and connecting parts in their assembled condition.

In a condition where the first and second connecting parts 103, 123 are assembled as illustrated in FIG. 3, the plating film 127 seals both of: a fitting surface of the first connecting part 103 and the pipe body 102; and a fitting surface of the second connecting part 123 and the pipe body 102. Therefore, sealing parts such as O-rings are unnecessary for these surfaces.

Next, a method of manufacturing the fuel delivery pipe 100 of this embodiment will illustratively be described. The method includes a pipe-body manufacturing step and a plating step.

(Pipe-Body Manufacturing Step)

In the pipe-body manufacturing step, the housing 102 is manufactured by forging and, succeedingly, quenching and tempering a round bar of the carbon steel.

Specifically, a process of forging the carbon steel is succeeded by the quenching and tempering process. This improves the toughness of the housing 102. In particular, the carbon steel should contain 0.3 wt % or more carbon to ensure the effect of the quenching and tempering process. The Vickers hardness of the housing 102 after the quenching and tempering process ranges from 230 to 290 HV.

(Plating Step)

Next, nickel-phosphorus plating process is performed on the housing 102 and the first and second connecting parts 103, 123 in their assembled condition.

Specifically, the first and second connecting parts 103, 123 are fitted into the first and second connecting portions 125, 126, respectively, so that the housing 102 and the first and second connecting parts are assembled together. Thereafter, the housing 102 with the first and second connecting parts 103, 123 is immersed in a plating bath, and, then, electroless nickel-phosphorus plating is performed.

More specifically, junctions between each parts (a junction between the housing 102 and the first connecting part 103 and a junction between the housing 102 and the second connecting part 123) are also plated. Thus, a gap formed in each junction is filled and sealed with the plating film 127.

As described above, with the present embodiment, the process of forging the carbon steel is succeeded by the quenching and tempering process. This improves the hardness and toughness of the carbon steel. This makes it possible to manufacture the fuel delivery pipe 100 having a higher mechanical strength.

An comparative example will now be described. Fuel delivery pipes compared in this example are: a pipe made with an aluminium alloy (JIS ADC10) die casting 2 mm or more in thickness; and a carbon steel (S45C) delivery pipe made by the method of this embodiment into a same shape with the die casting.

As a result of a loading and unloading test, a crack appeared in the ADC10 fuel delivery pipe after repeating 8,800,000 cycles of applying a load of 2 MPa and then a load of 22 MPa. On the other hand, it was proved that no crack appeared in the S45C fuel delivery pipe even after repeating 10,000,000 cycles of applying a load of 0 MPa and then a load of 50 MPa.

Furthermore, because the plating process is performed on the housing 102 and the first and second connecting parts in their assembled condition, the plating film fills and seals the gaps formed at a contact portion of the housing 102 and the first connecting part 103 and at a contact portion of the housing 102 and the second connecting part 123. Therefore, the sealing performance can be ensured without incorporating the sealing parts (such as O-rings) for sealing the gaps at the contact portions. Furthermore, because the housing 102 is made of the carbon steel, the housing 102 can be manufactured without undergoing such pretreatment as would be required in manufacturing an aluminium one.

Furthermore, because the plating film 127 covers the inner and outer surfaces of the housing 102, the inner surface can be protected from alcohol corrosion, while the outer surface can be protected from salt corrosion.

In particular, the inventor has found that the plating film 127 that is 10 μm or more in thickness can surely protect the outer surface from salt corrosion.

<Other Embodiments>

The present invention is not limited to the embodiment described above with the drawings. For example, following embodiments are also included within the scope of the present invention.

(1) In the above-described embodiment, electroless nickel-phosphorous plating is adopted as the plating process. The plating method is not limited to this. For example, electroplating can be adopted as the plating process. Furthermore, the plating material has to only be alcohol corrosion resistant.

(2) In the above-described embodiment, the plating process is performed on the housings 102 and the first and second connecting parts 103, 123 in their assembled condition. The present invention is not limited to this. For example, a process of plating each of the parts may be succeeded by the process of assembling these parts. Note only that, in a case of the above-described embodiment, such an effect that no sealing parts are needed for sealing the junctions.

What is claimed is:

1. A fuel delivery pipe for delivering fuel to a plurality of fuel injection valves corresponding to cylinders of an internal-combustion engine, the fuel delivery pipe comprising:
a pipe body made of carbon steel for machine structural use, the pipe body including a connecting portion;
a connecting part fitted to the connecting portion of the pipe body such that the pipe body and the connecting part form an assembly; and
a plating film disposed on substantially all of an inner surface and an outer surface of the assembly.

2. The fuel delivery pipe according to claim 1, wherein:
the plating film is 10 μm or greater in thickness.

3. A method of manufacturing a fuel delivery pipe for delivering fuel to a plurality of fuel injection valves corresponding to cylinders of an internal-combustion engine, the method comprising:
manufacturing a pipe body including a connecting portion, the manufacturing of the pipe body comprising forging carbon steel for machine structural use and successively quenching and tempering the carbon steel;
manufacturing a connecting part, the manufacturing of the connecting part comprising forging carbon steel for machine structural use;
assembling the pipe body and the connecting part together, the assembling comprising fitting the connecting part to the connecting portion of the pipe body to form an assembly; and
plating substantially all of an inner surface and an outer surface of the assembly, the plating comprising immersing the assembly in a plating bath.

4. The method according to claim 3, wherein
the plating comprises plating the assembly to obtain a plating film 10 μm or greater in thickness.

* * * * *